April 14, 1953  H. W. LYON  2,634,914
MILEAGE INDICATOR FOR AUTOMOTIVE VEHICLES
Filed May 16, 1952  2 SHEETS—SHEET 1
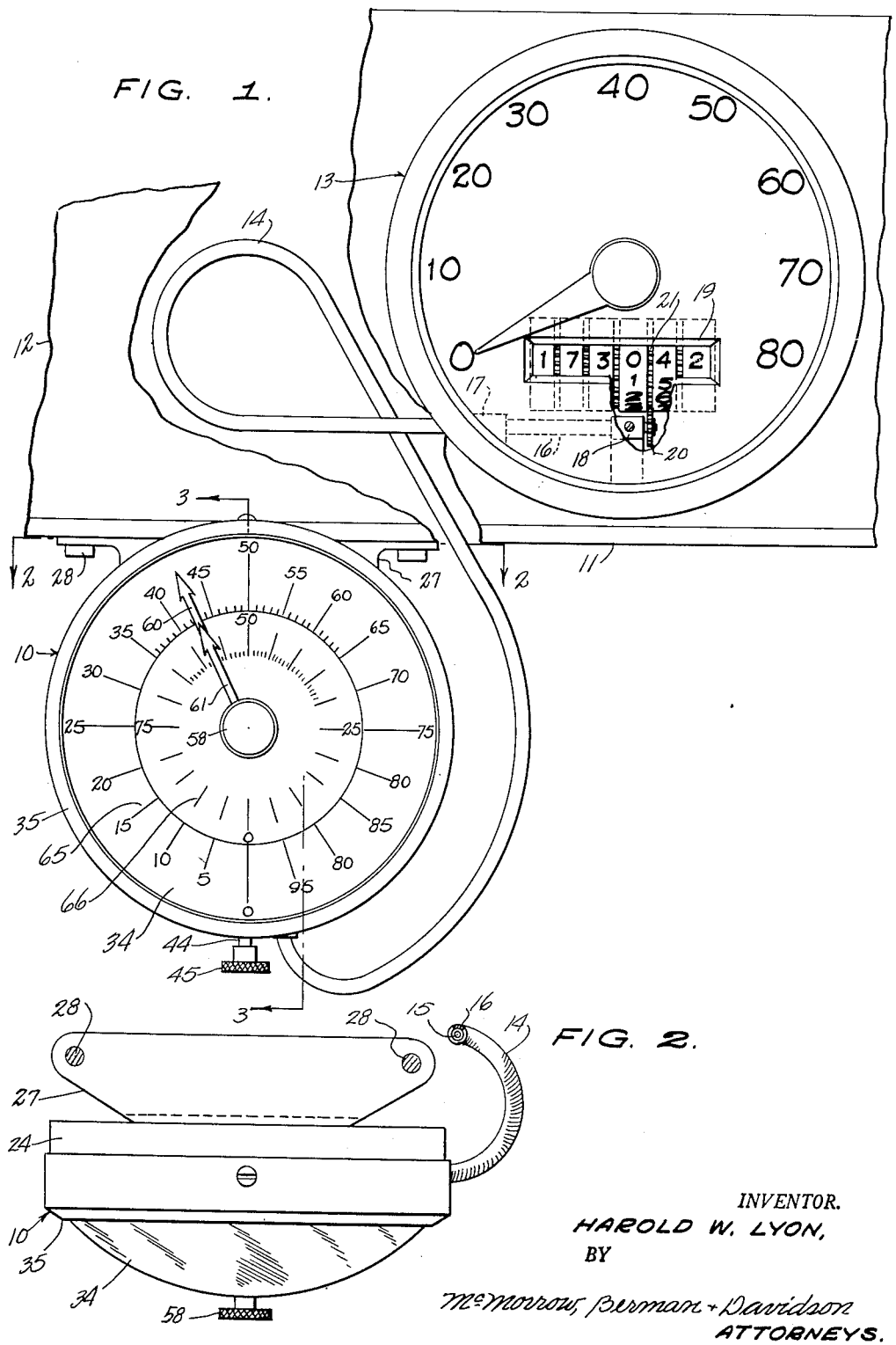
INVENTOR.
HAROLD W. LYON,
BY
McMorrow, Berman + Davidson
ATTORNEYS.

April 14, 1953          H. W. LYON          2,634,914
MILEAGE INDICATOR FOR AUTOMOTIVE VEHICLES
Filed May 16, 1952          2 SHEETS—SHEET 2
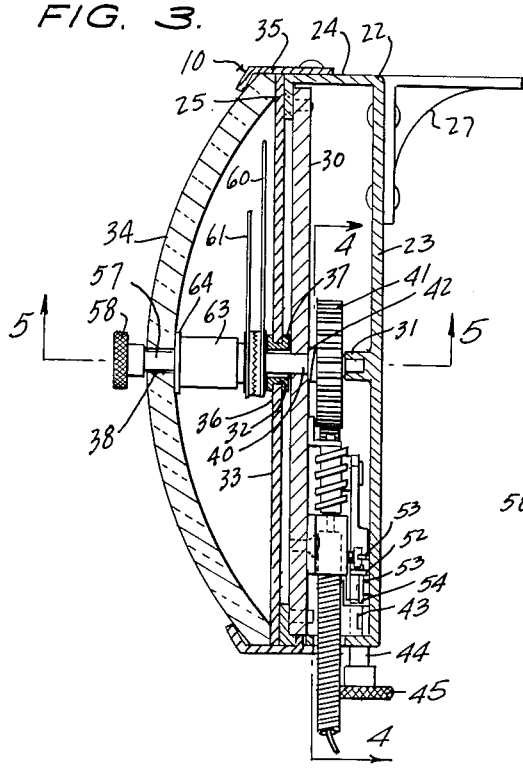
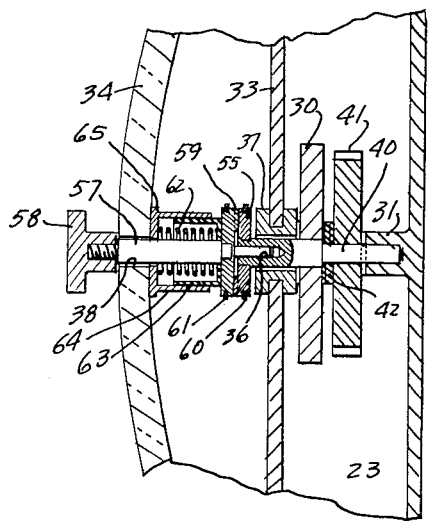
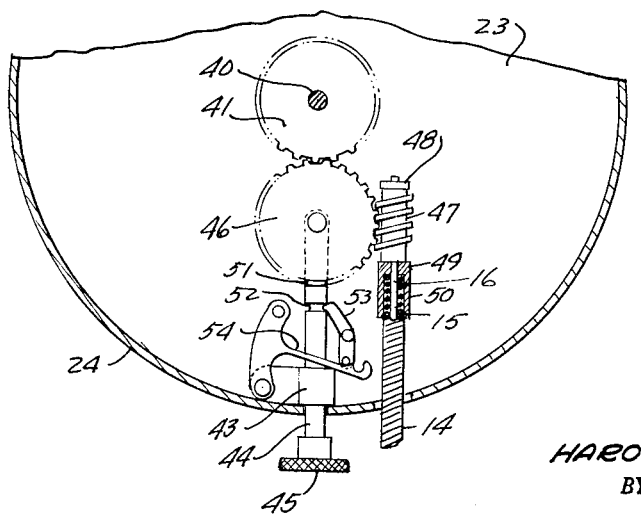
INVENTOR.
HAROLD W. LYON,
BY
McMorrow, Berman + Davidson
ATTORNEYS.

Patented Apr. 14, 1953

2,634,914

UNITED STATES PATENT OFFICE 2,634,914

MILEAGE INDICATOR FOR AUTOMOTIVE VEHICLES

Harold W. Lyon, Hagerstown, Md.

Application May 16, 1952, Serial No. 288,121

4 Claims. (Cl. 235—95)

This invention relates to mileage indicators or odometers and more particularly to a trip mileage indicator for an automotive vehicle which can be manually set at the beginning of a trip and will indicate the miles traveled from the starting point and the number of miles remaining to the destination at any place along the trip.

It is among the objects of the invention to provide an improved mileage indicator or odometer which can be easily mounted on an existing automotive vehicle and connected to the vehicle speedometer to indicate the number of miles traveled by the vehicle; which is manually settable and is provided with two dials and two hands or pointers cooperating respectively with the different dials to indicate the number of miles traveled from a starting point at which the mileage indicator was reset, and the number of miles remaining to a pre-selected destination; which may be easily set at the beginning of a trip to bring the pointer indicating the miles traveled to a zero position relative to its cooperating dial and the pointer indicating the number of miles remaining to a position relative to its cooperating dial corresponding to the known distance from the starting point to the destination of the particular trip; and which is simple and durable in construction, economical to manufacture, and neat and attractive in appearance.

Other objects and advantages will become apparent from a consideration of the following description and the appended claims in conjunction with the accompanying drawings, wherein:

Figure 1 is a front elevational view of a mileage indicator illustrative of the invention and a fragmentary elevational view of the associated portion of an automotive vehicle;

Figure 2 is a top plan view of the mileage indicator illustrated in Figure 1;

Figure 3 is a cross sectional view on the line 3—3 of Figure 1;

Figure 4 is a fragmentary cross sectional view on an enlarged scale on the line 4—4 of Figure 3; and Figure 5 is a fragmentary cross sectional view on an enlarged scale on the line 5—5 of Figure 3.

With continued reference to the drawings, the numeral 10 generally indicates the mileage indicator of the present invention and is shown in Figure 1 as mounted on the bottom flange 11 of the instrument panel 12 of an automotive vehicle and drivenly connected to the vehicle speedometer, generally indicated at 13, by a flexible coupling or shaft 14. The flexible shaft 14 includes a flexible, tubular casing or sheath 15 and a flexible core 16 extending through the sheath 15. At the speedometer end of the flexible shaft 14 the sheath 15 is secured at one end in a sleeve 17 and the core 16 extends from this end of the sheath and is journaled in a bearing 18 spaced from the sleeve 17 and positioned adjacent the odometer 19 of the vehicle speedometer. A gear 20 on the end of the core 16 meshes with a gear 21 on the unit mileage stage of the odometer 19 so that the core 16 of the flexible shaft is driven at a predetermined rate relative to the rate of rotation of the unit mileage stage of the odometer in the vehicle speedometer.

The mileage indicator 10 comprises a housing 22 having a flat back wall 23 of circular shape and a cylindrical side wall 24 extending marginally from the back wall and provided at its end remote from the back wall with inwardly directed lugs 25 and 26 at diametrically opposite locations therearound.

An angle bracket 27 has one leg secured to the back wall 23 at the outer side of the back wall and at the top of the instrument and has its other leg disposed beneath the bottom flange 11 of the vehicle instrument panel 12 and secured to the instrument panel flange by suitable means, such as the bolts 28.

A support 30 in the form of a bar of elongated rectangular shape, extends diametrically of the side wall 24 of the housing and is secured at its ends to the lugs 25 and 26. The back wall 23 is provided on its inner side with a centrally disposed bearing boss 31 and the support 30 is provided with a bearing aperture 32 in alignment with the boss 31. A dial plate 33 of circular shape is disposed against the end of the housing 22 remote from the back wall 23 and at the side of the support 30 remote from the back wall and a crystal 34, also of circular shape, is disposed at the side of the dial plate 33 remote from the support 30 and secured to the housing 22 by an annular bezel 35.

The dial plate is provided with a central aperture 36 in alignment with the aperture 32 and bearing boss 31 and receiving a sleeve or grommet 37 and the crystal 34 is provided with a central aperture 38 in alignment with the apertures 36 and 32.

A shaft 40 is journaled at one end in the bearing boss 31 and extends through the aperture 32 in the support 30 and through the grommet 37 and a gear 41 is mounted on the shaft 40 between the back wall 23 of the housing and the support 30 and drivingly connected to the gear by a friction connection 42.

A bearing sleeve 43 is mounted on the inner side of the back wall 23 of the housing at the bottom of the housing and a stem 44 extends slidably through this bearing sleeve toward the shaft 40. This stem 44 projects out of the bottom of the housing 22 and carries on its end outside of the housing a knob 45. A gear 46 is journaled on the other end of the stem 44 for rotation about an axis perpendicular to the longitudinal center line of the stem and meshes with the gear 41.

A worm 47 is journaled on the housing by bearings 48 and 49 and is secured on the support 30 at the side of the latter adjacent the back wall 23 and this worm meshes with the gear 46. The bearing 49 has an extension sleeve 50 thereon and the end of the sheath 15 of the flexible shaft 14 is secured in this sleeve extension while the core 16 of the flexible shaft extends through the bearing sleeve 49 and is connected to the worm 47 so that the gear 46 is driven by the flexible shaft from the odometer portion of the vehicle speedometer 13.

The stem 44 is provided within the housing 22 with spaced apart annular grooves 51 and 52 and a detent 53 is pivotally mounted on the back wall 23 and resiliently urged by a spring 54 into engagement in the grooves 51 and 52 of the stem 44.

The gear 46 is movable into and out of mesh with the gear 41 by sliding the shaft 44 through the sleeve 43 inwardly or outwardly of the housing 22 and the stem 44 is held in position maintaining the gear 46 in or out of mesh with the gear 41 by engagement of the detent 53 in the corresponding annular grooves 51 and 52. A dog clutch element 55 is mounted on the end of the shaft 40 at the side of the dial plate 33 remote from the support 30 and the shaft 40 is provided in this end with a coaxial recess or bore 56. A stem 57 extends through the aperture 38 in the crystal 34 and has a reduced end portion rotatably received in the bore 56 in the shaft 40. A knob 58 is secured on the end of the stem 57 at the outer side of the crystal 34 and a second dog clutch element 59 is secured on the stem 57 adjacent the clutch element 55 and engages the latter. A hand or pointer 60 is secured to the clutch element 55 and projects radially therefrom and a similar hand or pointer 61 is secured to the clutch element 59 and projects radially from the latter clutch element.

A coil compression spring 62 surrounds the stem 57 between the inner side of the crystal 34 and the adjacent side of the clutch element 59 and resiliently urges the clutch element 59 into engagement with the clutch element 53. A sleeve 63 is secured at one end to the clutch element 59 and surrounds the spring 62 and a complementary sleeve 64 is secured at one end to a washer 65 surrounding the stem 57 at the inner side of the crystal 34 and telescopically receives the sleeve 63, the spring 62 bearing at its corresponding end against the washer 65.

The dial plate 33 is provided on its face remote from the support 30 and adjacent the crystal 34 with concentric mileage dials 65 and 66 numbered in respectively opposite directions and cooperating with the pointers 60 and 61 respectively to indicate the mileage traveled on a trip from the starting point of the trip and the mileage remaining to a preselected destination.

Before starting a trip the stem 44 is checked to make sure that the gear 46 is in mesh with the gear 41 so that the pointers 60 and 61 will be driven by the odometer portion of the vehicle speedometer. The knob 58 is then rotated with the clutch elements 55 and 59 engaged to turn both pointers 60 and 61 and the shaft 40 relative to the gear 41 through the friction driving connection 42 until the pointer 60 is brought to the zero mark on the dial 65. The knob 58 is then pulled outwardly away from the crystal 34 to separate the clutch element 59 from the element 55 and is then turned to turn the pointer 61 to a location on the dial 66 corresponding to the known mileage from the starting point to the destination of the particular trip.

As the pointers are then driven by movement of the vehicle along the trip, the pointer 60 moving over the dial 65 will indicate the mileage traveled from the starting point at which this pointer was set at zero and the pointer 61 moving over the dial 66 will indicate the mileage remaining to the destination of the trip as it moves from its trip distance setting toward the zero point of the dial 66 which is numbered in the opposite direction from the dial 65.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims, are, therefore, intended to be embraced therein.

What is claimed is:

1. A mileage indicator for an automotive vehicle comprising a housing adapted to be mounted on a structural part of an associated vehicle and having a back wall, a support secured in said housing in spaced and substantially parallel relationship to said back wall and having a bearing aperture therein, a dial plate disposed in said housing at the side of said support remote from said back wall and having an aperture therein, a crystal mounted in said housing at the side of said dial plate remote from said support and having an aperture therein in alignment with the aperture in said dial plate and the bearing aperture in said support, a bearing boss on said back wall in alignment with said apertures, a shaft extending through said apertures and journaled at one end in said bearing boss, a first gear on said shaft between said support and said back wall, a bearing sleeve on said back wall at a location spaced from said first gear, a first stem slidably mounted in said bearing sleeve and projecting at one end out of said housing, a second gear journaled on said stem at the other end of the latter and movable into and out of mesh with said first gear by manually sliding said first stem through said bearing sleeve, a detent mounted on said back wall and engaging said stem to hold the latter in positions maintaining said second gear in or out of mesh with said first gear, a worm journaled on said back wall and meshing with said second gear, a flexible connector extending from said worm through said housing and adapted to be drivenly connected to the speedometer of an associated vehicle for driving said first gear, a friction driving connection between said shaft and said first gear, a first clutch element on said shaft disposed at the side of said dial plate remote from said support and having a coaxial recess therein, a first pointer extending radially from said first clutch element, a second stem journaled at one end in the recess in said first clutch element and extending through the aperture in said crystal, a second clutch element on said second stem adjacent said first clutch element, a second pointer projecting radially from said second clutch element, a spring disposed between said crystal and said second clutch element resiliently forcing said second clutch element into engagement with said first clutch element, and concentric mileage dials provided on the face of said dial plate remote from said support and numbered in respectively opposite directions to indicate the mileage traveled from a starting point and the mileage remaining to a preselected destination, said pointers cooperating respectively with said dials and said first pointer being settable relative to its associated dial by rotating said second stem with said clutch elements engaged thereby rotating said shaft relative to said first gear, said second pointer being settable relative to its associated dial by first pulling out said second stem to separate such clutch elements and then rotating said second stem.

2. In combination with an automotive vehicle having a structural part and a speedometer provided with an odometer portion, a mileage indicator comprising a housing mounted on said structural part, a dial plate mounted in said housing and having on one face thereof concentric dials numbered in respectively opposite directions, a shaft journaled in said housing and extending through said dial plate to said one face of the latter, means drivingly connecting said odometer portion to said shaft, pointers mounted on said shaft at said one side of said dial plate and cooperating one with each of said dials, and manually operated means extending from said shaft and effective to separately set said pointers relative to the corresponding dials.

3. In combination with an automotive vehicle having a structural part and a speedometer provided with an odometer portion, a mileage indicator comprising a housing mounted on said structural part, a dial plate mounted in said housing and having on one face thereof concentric dials numbered in respectively opposite directions, a shaft journaled in said housing and extending through said dial plate to said one face of the latter, means drivingly connecting said odometer portion to said shaft, pointers mounted on said shaft at said one side of said dial plate and cooperating one with each of said dials, and manually operated means extending from said shaft and effective to separately set said pointers relative to the corresponding dials, one of said pointers being rigidly mounted on said shaft and said means drivingly connecting said odometer portion to said shaft including a friction coupling permitting turning of said shaft and said one pointer by said manually operated means, the other of said pointers being rigidly secured to said manually operated means and said manually operated means including a dog clutch between said other pointer and said shaft permitting movement of said other pointer relative to said one pointer and said shaft.

4. In combination with an automotive vehicle having a structural part and a speedometer provided with an odometer portion, a mileage indicator comprising a housing mounted on said structural part, a dial plate mounted in said housing and having on one face thereof concentric dials numbered in respectively opposite directions, a shaft journaled in said housing and extending through said dial plate to said one face of the latter, means drivingly connecting said odometer portion to said shaft, pointers mounted on said shaft at said one side of said dial plate and cooperating one with each of said dials, manually operated means extending from said shaft and effective to separately set said pointers relatively to the corresponding dials, and a crystal secured to said housing on covering relationship to said dials and said pointers and having an aperture therein through which said manually operated means extends.

HAROLD W. LYON.

No references cited.